(12) United States Patent
Droger et al.

(10) Patent No.: US 7,622,526 B2
(45) Date of Patent: Nov. 24, 2009

(54) THERMOSET MATERIAL BASED ON ANTIPLASTICIZING POLYTHIOURETHANE AND OPHTHALMIC LENS COMPRISING AN ANTIPLASTICIZED THERMOSET MATERIAL

(75) Inventors: Nicolas Droger, Paris (FR); Jean-Louis Halary, Paris (FR); Gilles Richard, Alforville (FR); Martin Rickwood, Clarks Green, PA (US)

(73) Assignee: Essilor International, Charenton-le-Port (FR)

( * ) Notice: Subject to any disclaimer, the term of this patent is extended or adjusted under 35 U.S.C. 154(b) by 0 days.

(21) Appl. No.: 10/595,265

(22) PCT Filed: Sep. 29, 2004

(86) PCT No.: PCT/FR2004/050470

§ 371 (c)(1),
(2), (4) Date: Apr. 3, 2006

(87) PCT Pub. No.: WO2005/033190

PCT Pub. Date: Apr. 14, 2005

(65) Prior Publication Data

US 2006/0270771 A1    Nov. 30, 2006

(30) Foreign Application Priority Data

Oct. 3, 2003   (FR) .................. 03 50648

(51) Int. Cl.
| | |
|---|---|
| B01D 19/04 | (2006.01) |
| B01F 17/00 | (2006.01) |
| B29D 11/00 | (2006.01) |
| B60C 1/00 | (2006.01) |
| C08J 3/00 | (2006.01) |
| C08K 5/00 | (2006.01) |
| C08K 5/07 | (2006.01) |
| C08K 5/24 | (2006.01) |
| C08K 5/36 | (2006.01) |
| C08K 5/48 | (2006.01) |
| C08K 5/375 | (2006.01) |
| C08L 75/00 | (2006.01) |
| C08L 81/00 | (2006.01) |
| C08L 91/06 | (2006.01) |
| C08G 18/08 | (2006.01) |
| C08G 18/28 | (2006.01) |
| C08G 18/42 | (2006.01) |
| C08G 18/66 | (2006.01) |
| C08G 73/10 | (2006.01) |
| C08G 75/02 | (2006.01) |
| H01L 23/29 | (2006.01) |
| G02B 1/04 | (2006.01) |
| G02B 3/00 | (2006.01) |
| G02C 5/00 | (2006.01) |
| G02C 7/02 | (2006.01) |

(52) U.S. Cl. .................. 524/589; 264/1.32; 351/41; 351/159; 523/106; 523/435; 524/210; 524/211; 524/212; 524/213; 524/261; 524/262; 524/275; 524/282; 524/289; 524/293; 524/356; 524/359; 524/361; 524/362; 524/590; 524/609

(58) Field of Classification Search .............. 524/589, 524/210, 211, 212, 213, 261, 262, 275, 282, 524/289, 293, 392, 609, 590, 356, 359, 361, 524/362; 523/435, 106; 264/1.32; 351/41, 351/219, 159

See application file for complete search history.

(56) References Cited

U.S. PATENT DOCUMENTS

| | | | |
|---|---|---|---|
| 3,386,935 A | 6/1968 | Jackson et al. | 524/380 |
| 3,431,320 A | 3/1969 | Jackson et al. | 524/471 |
| 4,348,497 A | 9/1982 | Berghmans | 524/293 |
| 4,575,385 A | 3/1986 | Brooks et al. | 96/13 |
| 4,686,250 A | 8/1987 | Qureshi | 523/440 |
| 4,824,888 A | 4/1989 | Emmerling et al. | 524/199 |
| 5,512,376 A | 4/1996 | Brady et al. | 428/447 |
| 5,525,654 A * | 6/1996 | Podola et al. | 524/199 |
| 5,962,561 A | 10/1999 | Turshani et al. | 524/140 |
| 2003/0144452 A1 | 7/2003 | Jallouli et al. | 528/44 |

Antiplasticizing as illustrated by the DMA spectrum

FOREIGN PATENT DOCUMENTS

EP    0329388    8/1989

OTHER PUBLICATIONS

Jackson and Caldwell, "Antiplasticization. II. Characteristics of Antiplasticizers," *J. Appl. Polym. Sci*, 11:211-226, 1967.

Sauvant and Halary, "Improvement of the performance of epoxy-amine thermosets by antiplasticizer-induced nano-scale phase separation during cure," *Composite Sci. and Tech.*, 62:481-486, 2002.

Sauvant and Halary, "Novel Formulations of High-Performance Epoxy-Amine Networks Based on the Use of Nanoscale Phase-Separated Antiplasticizers," *J. Appl. Polym. Sci.*, 82:759-774, 2001.

\* cited by examiner

*Primary Examiner*—Patrick D Niland
(74) *Attorney, Agent, or Firm*—Fulbright & Jaworski

(57) ABSTRACT

The invention relates to a thermoset plastic material, comprising a three-dimensional matrix containing sulphur atoms and at least one anti-plasticizing additive which is unreactive toward said matrix.

39 Claims, 6 Drawing Sheets

Antiplasticizing as illustrated by the DMA spectrum

E' modulus evolution versus temperature for pp-ch-u additive-containing systems

E' modulus evolution versus temperature for pp-ch-u additive -containing systems Detailed curve XDI/OONDI/3SH polymer gel time at 60°C versus catalyst level Standard and short thermal cycles (starting at 60°C)

Geometry of a three-point bend fracture specimen

THERMOSET MATERIAL BASED ON ANTIPLASTICIZING POLYTHIOURETHANE AND OPHTHALMIC LENS COMPRISING AN ANTIPLASTICIZED THERMOSET MATERIAL

This application is a national phase application under 35 U.S.C. § 371 of International Application No. PCT/FR2004/050470 filed 29 Sep. 2004, which claims priority to French Application No. 03/50648 filed 3 Oct. 2003. The entire text of each of the above-referenced disclosures is specifically incorporated herein by reference without disclaimer.

The present invention relates generally to novel thermoset materials containing sulphur atoms and having an improved impact resistance, and also relates to optical articles, especially ophthalmic lenses made of thermoset materials that contain in particular sulphur atoms with a better impact resistance.

Research on novel polymer-based materials in order to produce said "organic" glasses is a constant matter of concern in the ophthalmic field.

For these materials to be applied in the ophthalmic field, they not only have to be transparent of course, but they also must have a high refractive index ($n_D^{25}$), so as to reduce the glass thickness, as well as very good mechanical properties, especially with regard to the impact and scratch resistance.

High refractive index classical materials used in ophthalmic optics are thermoset plastic materials based on polythiourethane. These materials may have refractive indices ($n_D^{25}$) of 1.67 or above.

However, such thermoset materials based on polythiourethane have a poor impact resistance, especially as compared to a material such as polycarbonate ($n_D^{25}=1.59$). These thermoset materials based on polythiourethane are produced by polyaddition of polythiols and polyisocyanates. Their brittleness results from the high cross link density needed for obtaining thermal properties sufficient for an ophthalmic application.

As opposed to polycarbonate, (thermoplastic), they are on the other hand substantially more solvent resistant.

Therefore, it would be desirable to improve the impact resistance properties of these materials while preserving their intrinsic properties.

Generally speaking, a number of methods have been developed and studied so as to improve polymer matrix breaking strength and impact resistance. Known solutions, for both thermoplastic and thermoset materials provide for a second, more flexible phase. Such phase acts as a stress concentrator within the material, and enables the triaxial stress state to be relaxed (through cavitation or plasticity development), slows down the crack propagation rate (crack deviation, multiple crack formation) and facilitates the shear strain within the lattice.

The phase separation may be obtained during polymerization, by combining different types of monomers or prepolymers inducing soft segments and rigid segments.

During the polymer preparation, some arrangement get organized based on the difference of affinity between such segments. Depending on the selected monomers, segregation may be more or less marked.

While this method often applies to linear segmented polymer formation (thermoplastic polymers) it also may be used for crosslinked polymers.

The reaction generally proceeds in two steps. In the first step a long chain-containing soft prepolymer is formed, then rigid segments are integrated, the viscosity having been optionally adjusted in the meantime by adding monomers.

The crucial parameter for the morphology evolution is the second reactant solubility in the prepolymer and the evolution thereof during the chain growth.

Many studies have been conducted on polyurethanes and polyurethane/urea hybrids.

Studies on epoxy lattices have demonstrated an increase in the impact resistance in presence of anti-plasticizing and damping additives. Recent studies (Sauvant V; Halary J. L; J. Appl. Polym. Sci; 82, 759 (2001) and Sauvant V; Halary J. L; Composite Sci and Tech; 62, 481 (2002)) showed indeed that with epoxy lattices, a phase separation may be obtained while retaining the antiplasticized character of the material. The material morphology is that of a nanocomposite, with additive molecule aggregates dispersed within a matrix plasticized by residual molecules.

With 15% by weight of antiplasticizing additives providing a damping effect, the storage modulus E' at 25° C. was thus increased by 1.3 and the energy release ratio $G_{IC}$ by 5. Moreover, moisture uptake was reduced. It will be appreciated that with a non damping antiplasticizer, the increase in the modulus is identical, but that the toughness rise is very limited. Indeed, the drop in glass transition temperature makes it possible for the antiplasticized material to be more resistant than the pure matrix, but not to such an extent as with the damped antiplasticized material.

The American patent U.S. Pat. No. 4,348,497 describes thermosetting acrylic compositions comprising as antiplasticizer a tetrabenzoate penthaerythritol. The antiplasticizer improves hardness and resistance to solvents. The material is used for producing coatings.

The American patent U.S. Pat. No. 5,512,376 describes vinyl/SiH compositions comprising an antiplasticizer incorporated into the polymerizable composition prior to polymerizing.

It is thus an object of the present invention to provide thermoset materials containing sulphur atoms, preferably comprising a polythiourethane matrix or resulting from the polymerization of at least one polyepisulfide, in particular a diepisulfide, and having an improved impact resistance.

It is another object of the present invention to provide an ophthalmic lens comprising an optically transparent thermoset matrix, especially containing sulphur atoms, preferably a polythiourethane matrix or resulting from the polymerization of at least one polyepisulfide, in particular a diepisulfide, having an improved impact resistance.

According to the present invention, the hereabove objectives are achieved by adding to the thermoset matrix, especially a polythiourethane matrix, at least one molecule that does not react with the matrix and that imparts to said matrix antiplasticizing and preferably also damping properties.

Definitions

Antiplasticization

Introducing a small, non reactive molecule into a polymer results in the plasticization of the material that is characterized by a drop in glass transition temperature (Tg), as well as by a decrease in the storage modulus as compared to the pure material. The additive is then called plasticizer. The antiplasticization as evidenced by Jackson and Caldwell (Jackson W. J., Caldwell J. R, J. Appl. Polym. Sci, 11, 211 (1967), Jackson W. J., Caldwell J. R, J. Appl. Polym. Sci, 11, 227 (1967)) does also express as a decrease in the glass transition temperature, but differentiates itself from plasticization in that the storage modulus increases in a temperature range that is generally close to the ambient temperature. In that case, the additive is called antiplasticizer.

This particularity is due to a strong attenuation of a significant secondary transition, close to the ambient temperature, but the fact that a secondary transition does exist involves a drop in the storage modulus.

The transition attenuation causes the modulus decrease to disappear in this temperature range. Thus, the plasticizing effect of the molecule on the material modulus is hindered in the temperature range that is affected by the secondary transition attenuation: the material is antiplasticized.

A good affinity between the additive and the polymer is necessary for the antiplasticization. This is often achieved by using an additive the chemical structure of which is close to that of the matrix.

The molecular origin of this phenomenon has been explained only recently. It comes from an immobilization caused by the additive molecules of the movements that are responsible for the secondary transition, at the movement propagation points.

Damping

Damping reflects the reinforcement of the impact resistance toughness resulting from a phase separation within the material. Obtaining antiplasticization together with damping implies the selection of an additive with particular solubility properties. It must be fully miscible with the monomers, while immiscible with the polymer formed.

The phase separation occurs during the polymerization.

As defined herein the phase separation means at least one new phase being created in the form of domains, the largest size of which is less or equal to 10 micrometers and the antiplasticizing additive content of which is higher than that of the three-dimensional polymer matrix remainder.

Preferably, the maximal size of such domains is less than 500 nm.

More preferably, the maximal size of such domains is less than 50 nm. In the later case, it has to be considered by definition as being a nanophase separation.

Most preferably, the maximal size of such domains is less than or equal to 20 nm.

According to a first aspect, the present invention provides a thermoset plastic material having a three-dimensional matrix containing sulphur atoms, preferably a polythiourethane matrix or a polyepisulfide matrix, and at least one antiplasticizing additive which is unreactive with said matrix, and preferably selected so as to produce a nanophase separation within the final thermoset material.

According to a second aspect, the present invention provides an ophthalmic lens made of an optically transparent, thermoset plastic material, comprising a three-dimensional polymer matrix, the loss modulus (E") of which has a secondary glass transition (β), especially of polythiourethane, and at least one antiplasticizing additive, which is unreactive with said matrix polymer and preferably producing a nanophase separation within the final thermoset plastic material.

Antiplasticized thermoset materials according to the invention preferably have an energy release ratio $G_{IC}$ above 0.15 kJ.m$^{-2}$ and more preferably of 0.20 or more.

Antiplasticizers according to the invention have an antiplasticization temperature range generally ranging from 0 to 85° C.

As previously stated, antiplasticizing additives generally have a solubility parameter ($\delta_a$) relatively close to that of the monomers previously used to form the matrix so as to be miscible in the latter, but preferably sufficiently different from that of the formed matrix so that a phase separation can occur.

In general the solubility parameter δ does satisfy the following relation:

$$\delta_{mo} - \delta_a < 5 \text{ MPa}^{1/2}$$

wherein $\delta_{mo}$ corresponds to the solubility parameter of the monomers previously used for producing the matrix, especially polyisocyanates and polythiols as far as a polythiourethane matrix is concerned.

Also preferably the solubility parameter δ does satisfy following relation:

$$\delta_{ma} - \delta_a > 4 \text{ MPa}^{1/2},$$

wherein $\delta_{ma}$ corresponds to the solubility parameter of the matrix.

The antiplasticizing additive generally has a solubility parameter satisfying the following relation:

$$19 \leq \delta_a \leq 23.$$

The addivity law used to calculate solubility parameters δ ($MPa^{1/2}$) is as follows:

$$\delta = \left( \frac{-\sum_z {}^z\Delta U}{\sum_z {}^z V} \right)^{\frac{1}{2}},$$

where $^z\Delta U$: molar vaporization energy and $^z V$: molar volume.

There are several classifications (Hoy, Fedors, Bondi, . . . ). Fedors tables have been chosen as the most frequent values in "Handbook of Solubility Parameters" (Barton A. F. M., Handbook of Solubility Parameters, CRC Press, Boca Raton (1991)) were provided by this author.

Antiplasticizing additives suitable for the present invention may be selected from dialkyl sulfides, diaryl sulfides, dialkylaryl sulfides, alkylaryl sulfides, arylalkylaryl sulfides, aryl and alkyl silane sulfides, carbonyl derivatives, S-arylthioalkylates, bis-arylthioalkyls, thiourea derivatives, urethane derivatives, diurethane derivatives and mixtures thereof.

A first class of antiplasticizing additives includes thioethers of formula:

wherein $R^1$ and $R^2$, being the same or different, represent independently from each other an alkyl radical, preferably a $C_1$-$C_2$ alkyl radical, more preferably a $C_4$-$C_{10}$ alkyl radical, in particular an octyl radical; a cycloalkyl radical, preferably a 6-membered radical, such as a cyclohexyl radical; an aryl radical such as a phenyl radical; an arylalkyl radical such as a benzyl radical; a radical

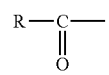

wherein R is an alkyl radical, preferably a $C_1$-$C_6$ alkyl radical such as methyl, ethyl, propyl; a trialkyl silane radical, especially a trimethyl silane.

A second class of antiplasticizing additives includes carbonyl derivatives of formula:

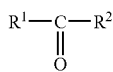

wherein $R^1$ and $R^2$ are such as previously defined.

A third class includes thioureas of formula:

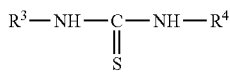

wherein $R^3$ and $R^4$, being the same or different, represent independently from each other an alkyl radical, preferably a $C_1$-$C_{12}$ alkyl radical, more preferably a $C_4$-$C_{10}$ alkyl radical, a cycloalkyl radical, preferably a 6-membered radical such as a cyclohexyl radical; an alkyl radical bearing a nitrogen and/or an oxygen heterocycle such as a 4-morpholinoalkyl radical, especially a 4-morpholinoethyl radical.

A fourth class of antiplasticizing additives includes urethanes of formula:

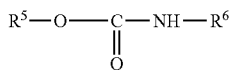

wherein $R^5$ and $R^6$, being the same or different, represent independently from each other a cycloalkyl group, preferably a 6-membered radical, such as a cyclohexyl radical; a cycloalkyl alkyl group such as a cyclohexylalkyl group, in particular a cyclohexylpropyl group; an aryl group such as a phenyl group; an arylalkyl group in particular a phenylpropyl group.

A fifth class of antiplasticizing additives includes diurethanes.

A first group of diurethanes includes those of formula:

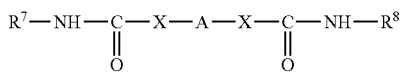

wherein A represents a $C_1$-$C_{12}$ alkylene group, preferably a $C_6$-$C_{10}$ alkylene group, in particular an octylene group, a group:

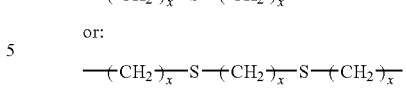

or:

wherein x is an integer ranging from 1 to 6, preferably x is 2; X represents —O— or —S—; and $R^7$ and $R^8$ represent independently from each other, a cycloalkyl group, preferably a 6-membered group, in particular a cyclohexyl group, or an aryl group, preferably a 6-membered group, in particular a phenyl group.

A second group of diurethanes includes diurethanes of formula:

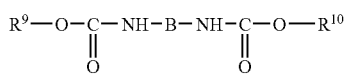

wherein B represents a radical of formula:

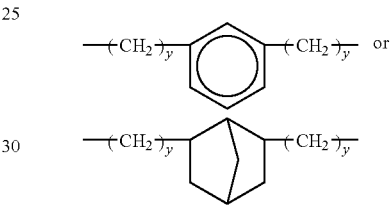

wherein y is an integer ranging from 1 to 4, preferably y is 1, and $R^9$ and $R^{10}$ represent independently from each other, a cycloalkyl-alkyl radical, in particular a cyclohexyl($C_1$-$C_6$) alkyl radical such as a cyclohexylethyl or cyclohexylpropyl radical; an aryl($C_1$-$C_6$)alkyl radical, in particular a phenylpropyl radical; a (bridged) cycloalkyl ($C_1$-$C_6$)alkyl radical such as a norbornylmethyl radical; ether-oxide radicals of formula:

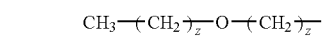

wherein z is an integer ranging from 1 to 4, preferably z is 2.

Amongst the preferred plasticizing additives are:
Commercial additives,

| Abbreviation | Name | Formula | $\delta_a$ MPa$^{1/2}$ | $n_{GD}$ |
|---|---|---|---|---|
| os | Dioctyl sulfide | | 17.5 | 1.466 |
| bps | Benzyl and phenyl sulfide | | 22.0 | 1.649 |

-continued

| Abbreviation | Name | Formula | $\delta_a$ MPa$^{1/2}$ | $n_{GD}$ |
|---|---|---|---|---|
| dbs | Dibenzyl sulfide | | 21.7 | 1.632 |
| 4ptbp | 4-(p-tolylthio)benzophenone | | 23.8 | 1.728 |
| bptm | bis(phenylthio)methane | | 23.0 | 1.689 |
| sptp | S-phenylthiopropionate | | 21.9 | 1.555 |
| ptm-tms | Phenylthiomethyl trimethyl silane | | 18.5 | 1.539 |
| ch-me-tu | 1-cyclohexyl-3-(2-morpholinoethyl)-2-thiourea | | 22.7 | 1.600 |

Synthesized additives,

| Abbreviation | Name | Formula | $\delta_a$ MPa$^{1/2}$ | $n_{GD}$ |
|---|---|---|---|---|
| chp-ch-u | cyclohexylpropyl-cyclohexyl-urethane | | 19.7 | 1.509 |
| pp-ch-u | phenylpropyl-cyclohexyl-urethane | | 20.9 | 1.558 |
| Ch-ch-odu | cyclohexyl-cyclohexyl-(octane diurethane) | | 20.6 | 1.527 |

-continued

| Abbreviation | Name | Formula | $\delta_a$ MPa$^{1/2}$ | $n_{GD}$ |
|---|---|---|---|---|
| Chp-chp-xdu | cyclohexylpropyl-cyclohexylpropyl-xylylene diurethane | | 21.1 | 1.566 |
| che-che-xdu | cyclohexylethyl-cyclohexylethyl xylylene diurethane | | 21.4 | 1.573 |
| pp-p-u | phenylpropyl-phenyl-urethane | | 22.4 | 1.634 |
| pe-pe-xdu | propoxyethyl-propoxyethyl xylylene diurethane | | 21.5 | 1.556 |
| nm-nm-xdu | norbornanemethyl-norbornanemethyl xylylene diurethane | | 22.3 | 1.615 |
| pp-pp-xdu | phenylpropyl-phenylpropyl-xylylenediurethane | | 22.8 | 1.637 |
| ch-ch-tdedSu | cyclohexyl-cyclohexyl-(thiodiethane di-S-thiourethane) | | 22.8 | 1.606 |
| p-p-tdedSu | phenyl-phenyl-(thiodiethane di-S-thiourethane) | | 25.1 | 1.733 |
| ch-ch-dtodu | cyclohexyl-cyclohexyl-(dithiaoctane diurethane) | | 22.0 | 1.578 |
| p-p-dtodu | phenyl-phenyl-(dithiaoctane diurethane) | | 24.1 | 1.688 |
| chp-chp-ndu | cyclohexylpropyl-cyclohexylpropyl dimethyl norbornane diurethane | | 20.5 | 1.546 |

| Abbreviation | Name | Formula | $\delta_a$ MPa$^{1/2}$ | $n_{GD}$ |
|---|---|---|---|---|
| che-che-ndu | cyclohexylethyl-cyclohexylethyl dimethyl norbornane diurethane | | 20.7 | 1.551 |
| pe-pe-ndu | propoxyethyl-propoxyethyl dimethyl norbornane diurethane | | 20.7 | 1.532 |
| nm-nm-ndu | norbornanemethyl-norbornanemethyl dimethyl norbornane diurethane | | 21.4 | 1.589 |
| pp-pp-ndu | phenylpropyl-phenylpropyl-dimethyl-norbornane diurethane | | 22.0 | 1.610 |
| ch-ch-tdedu | cyclohexyl-cyclohexyl (thiodiethane diurethane) | | 21.8 | 1.563 |
| p-p-tdedu | phenyl-phenyl-(thiodiethane diurethane) | | 24.2 | 1.689 |

Additive solubility parameters were calculated as previously stated and the refractive index was estimated according to the Blackstone and Dale method (1858): $n_{GD}=1+R_{GD}/V$.

$R=\Sigma_i R_i$, where Ri is defined for each molecule constitutive group (Van Krevelen, D. W., Properties of Polymers, Elsevier (1990); V represents the molar volume.

Synthesized additives were synthesized from thiols or from alcohols and isocyanates in suitable molar amounts.

If possible, the reaction is a high temperature bulk reaction.

When the melt temperature of the final compound needs an excessively high heating temperature to keep in a liquid state, a solvent will be preferably used together with an evaporation step.

Antiplasticizing additives suitable for the present invention may also be selected from compounds of following formulas:

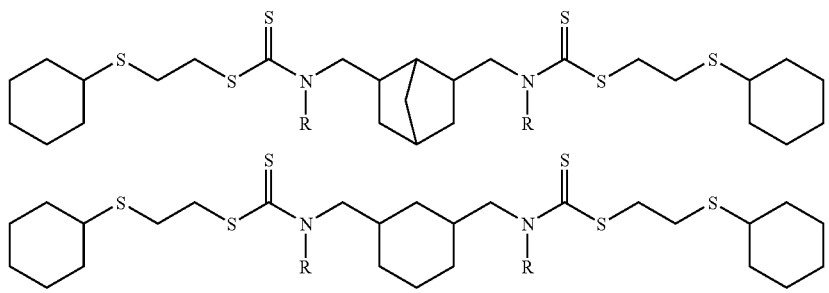

wherein R represents H, an alkyl group, especially, a methyl, ethyl, n-propyl or n-butyl group, or an aryl group, especially a phenyl group, or isomers thereof of formula:

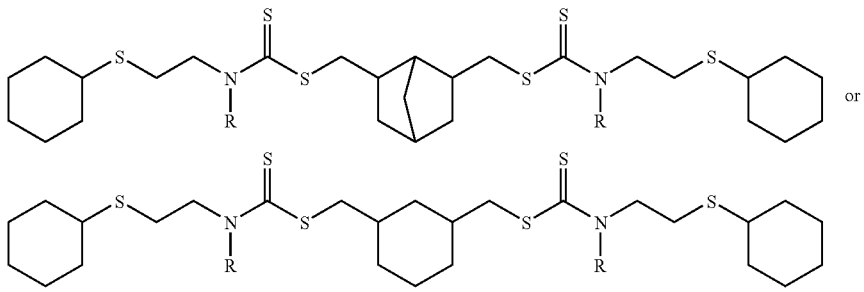

wherein R represents H, an alkyl group, especially a methyl, ethyl, n-propyl or n-butyl group, or an aryl group, especially a phenyl group.

As an example, [bicyclo[2.2.1]heptane-2,6 carbamate (and 2,5)-diylbis(methylene)]bis[(2-ethandiyl)thio]cyclohexyl sulfide preparation is described hereunder.

A solution of carbon disulfide (25.04 g; 0.329 mol, 19.8 mL) and dry chloroform (120 mL) is added dropwise to a solution cooledat −5° C. of bicyclo[2.2.1]heptane-2,6 (and 2,5)-dimethanamine (23.10 g; 0.150 mol; International Resources), triethylamine (30.26 g; 0.300 mol, 4.16 mL) and dry chloroform (240 mL), under nitrogen. The mixture is cooledat −5° C. again, then a solution of [(2-bromoethyl)thio] cyclohexane (67.16 g; 0.300 mol) is added dropwise to dry chloroform (120 mL). The resulting reaction mixture is then warmed up to the ambient temperature, and kept under stirring at the same temperature for 18 hours.

The reaction mixture is then concentrated under vacuum and the residue is dissolved in ethyl acetate, and washed with aqueous hydrochloric acid (1.0 M) then with water. The ethyl acetate phase is separated, dried and submitted to evaporation to give [bicyclo[2.2.1]heptane-2,6 carbamate (and 2,5)-diyl-bis(methylene)]bis[(2-ethandiyl)thio]cyclohexyl sulfide as a pale yellow viscous oil. (88.39 g; yield 99.6%)

As an example, [1,3-cyclohexanediyl bis(methylene)]bis [(2-ethandiyl)thio]cyclohexyl sulfide carbamate preparation is described hereunder.

A solution of carbon disulfide (11.76 g; 0.155 mol, 19.6 mL) and dry chloroform (120 mL) is added dropwise to a solution cooledat −5° C. comprising 1,3-bis(aminoethyl) cyclohexane (10.03 g; 0.155 mol), triethyl amine (14.23 g; 0.141 mol, 19.6 mL) and dry chloroform (120 mL), under nitrogen. The resulting reaction mixture is warmed up to the ambient temperature for one hour then kept under stirring for 1 hour.

The reaction mixture is then cooledat −5° C. and treated dropwise with a solution of [(2-bromoethyl)thio]cyclohexane sulfide (34.5 g; 0.155 mol) in dry chloroform (60.0 mL). The reaction mixture is then warmed up to the ambient temperature, then kept under stirring for 18 hours.

The reaction mixture is then concentrated under vacuum and the residue is dissolved in ethyl acetate, and washed with aqueous hydrochloric acid (1.0 M), then with water. The organic phase is separated, dried and submitted to evaporation to give [1,3-cyclohexane diylbis(methylene)]bis[(2-ethandiyl)thio]cyclohexyl sulfide carbamate as a pale yellow viscous oil. (35.32 g; yield 86.8%)

The preparation of the cyclohexylpropyl cyclohexypropyl dimethyl norbornane diurethane additive (chp-chp-ndu) will now be described as an example.

Compounds

| Name | weight (g) | mole number (mmol) |
|---|---|---|
| Cyclohexyl propanol (chp) | 11.60 | 81.6 |
| Dimethylnorbornyl diisocyanate (NDI) | 8.40 | 40.7 |
| (dibutyltin dichloride) catalyst | 0.002 | 0.01% by weight |

Procedure

Cyclohexyl propanol, dimethyl norbornyl diisocyanate and the catalyst are mixed together. The mixture is heated at 70° C. and diisocyanate-characteristic peak disappearance is monitored by infrared spectroscopy (typical time=2 hours). Heating is stopped and the product is conditioned under inert atmosphere ($N_2$ or Ar).

Generally, the antiplasticizing agent represents from 5 to 25% by weight as compared to the total weight of the polythiourethane matrix and more preferably from 5 to 15% by weight.

As previously stated, the thermoset plastic material according to the invention comprises a three-dimensional matrix containing sulphur atoms.

Preferably, it is a polythiourethane matrix.

Another preferred thermoset plastic material is a polymer obtained by polymerizing a composition comprising at least one polyepisulfide, preferably a diepisulfide.

The polythiourethane three-dimensional matrix is obtained by polyaddition of at least one polyisocyanate, preferably a diisocyanate, and of at least one polythiol, preferably a tri- or tetrathiol.

Polyisocyanates are generally aromatic polyisocyanates, aliphatic and cycloaliphatic polyisocyanates and mixtures thereof.

Preferably, di- or triisocyanates will be used, even more preferably diisocyanates.

Aromatic polyisocyanates include for example phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzyl triisocyanate, xylylene diisocyanate (XDI), benzyl triisocyanate, 4,4'-diphenylmethane diisocyanate and isophorone diisocyanate.

Aliphatic polyisocyanates include for example hexamethylene diisocyanate.

Cycloaliphatic polyisocyanates include for example bis (isocyanate)methyl cyclohexane, dicyclohexyl methane diisocyanate, dimethyl norbornyl diisocyanate (NDI) and norbornyl methyl diisocyanate.

Of course mixtures of such diisocyanates may be used. The preferred diisocyanate mixture comprises a combination of xylylene diisocyanate (XDI) and dimethyl norbornyl diisocyanate (NDI), especially a 50:50 mixture (w/w).

Polythiol monomers may have following formula:

wherein R' is an organic group the valence of which corresponds to n'; n' being an integer ranging from 2 to 6, preferably being 3 or 4.

A preferred polythiol class includes polythiols of formula:

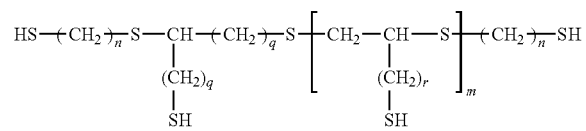

wherein n is an integer ranging from 1 to 4, preferably n is 2, p, q and r are integers ranging from 1 to 4, preferably 1, and m is 1 or 2.

Preferred polythiol monomers include for example aliphatic polythiols such as penthaerythritol tetrakis mercaptopropionate, 1-(1'-mercaptoethylthio)-2,3-dimercaptopropane, 1-(2'mercaptopropylthio)-2,3-dimercaptopropane, 1-(3'-mercaptopropylthio)-2,3-dimercaptopropane, 1-(4'-mercaptobutylthio)-2,3-dimercaptopropane, 1-(5'-mercaptopenthylthio)-2,3-dimercaptopropane, 1-(6'-mercaptohexylthio)-2,3-dimercaptopropane, 1,2-bis(4'-mercaptobutylthio)-3,mercaptopropane, 1,2-bis(6'-mercaptohexyl)-3-mercaptopropane, 1,2,3-tris (mercaptomethyl thio)propane, 1,2,3-tris(3'-mercaptopropylthio)propane, 1,2,3-tris(2'-mercaptoethylthio)propane, 1,2,3-tris-(4'-mercaptobutylthio)propane, 1,2,3-tris(6'-mercaptohexylthio)propane, 1,6-hexanethiol-1,2,3-propanetritiol and 1,2-bis(2'-mercaptoethylthio)-3-mercaptopropane.

Preferred polythiols include 3-(2-sulfanylethylthio)-2-(2-sulfanylethylthio)propane-1-thiol of formula:

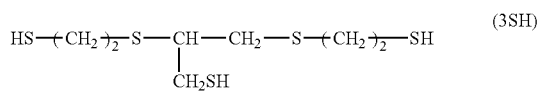

and tetrathiol of formula:

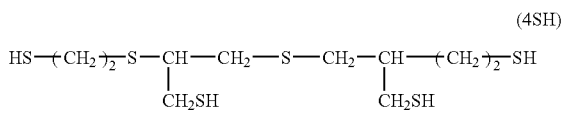

Polythiourethane matrices according to the invention may also be prepared from polythiourethane prepolymers having isocyanate and thiol end groups.

Preferred isocyanate end group-containing prepolymers have a number average molecular weight ranging from 1000 to 2000, preferably ranging from 1300 to 1700, and a NCO/SH ratio from 4:1 to 30:1, preferably of 6:1 or more, and typically of 8:1.

SH end group-containing polythiourethanes preferably have a number average molecular weight ranging from 200 to 300 and a SH/NCO ratio ranging from 4:1 to 30:1, preferably of 6:1 or more, and typically of 8:1.

Any classical catalyst may be used for catalyzing the polyaddition reaction of the polyisocyanates and polythiols to produce polythiourethane matrices according to the invention. Such catalysts include for example tertiary amines, such as triethyl amine, organometallic compounds such as dimethyltin dilaurate, dibutyltin dilaurate and dibutyltin dichloride, alkaline metal salts, alkaline earth metals, transition metals and acid ammonium salts satisfying the condition $0.5 \leq pKa \leq 14$.

Cocatalysts or promoters may also be used such as N,N-dimethyl cyclohexyl amine and 1,4-diaza-bicyclo-[2,2,2]-octane to increase catalyst activity.

Alkaline metal salts include especially KSCN optionally in admixture with a donor compound, such as an acetonitrile, amine, sulphone, sulfoxide, triarylsulfoxide, nitro, ethyleneglycol ether, crown ether and cryptate compound. Preferred donor compounds are crown ether and cryptands.

In a further aspect, the polyaddition reaction for producing the polythiourethane matrix is well known from those skilled in the art and occurs in classical conditions.

The present invention further relates to an ophthalmic lens comprising an optically transparent, thermoset plastic material, comprising a three-dimensional polymer matrix, the loss modulus (E") of which presents a secondary glass transition (β), and at least one antiplasticizing additive, also preferably having a damping effect.

Preferably, the lens thermoset material does exhibit a nanophase separation, such as previously defined.

As already mentioned, the matrix may be any transparent three-dimensional polymer matrix, the loss modulus (E") of which does exhibit a secondary glass transition (β).

Suitable three-dimensional polymer matrices include for example three-dimensional matrices containing sulphur atoms and in particular polythiourethane matrices as described hereabove, and matrices produced by polymerizing at least one polyepisulfide, especially a diepisulfide.

Antiplasticizing additives may be selected from additives such as those previously described taking also into account the conditions, as well as the amounts, that have been previously mentioned.

Naturally, choosing the antiplasticizer will depend on the nature of the matrix and should be such that a final transparent material is produced.

In general, thermoset materials for the ophthalmic lenses according to the invention are materials having a high refractive index ($n_D^{25}$) i.e. an index of at least 1.54, more preferably 1.60 or more, and most preferably of 1.65 or more.

The rest of the description refers to the appended figures which represent, respectively:

Figure 1:
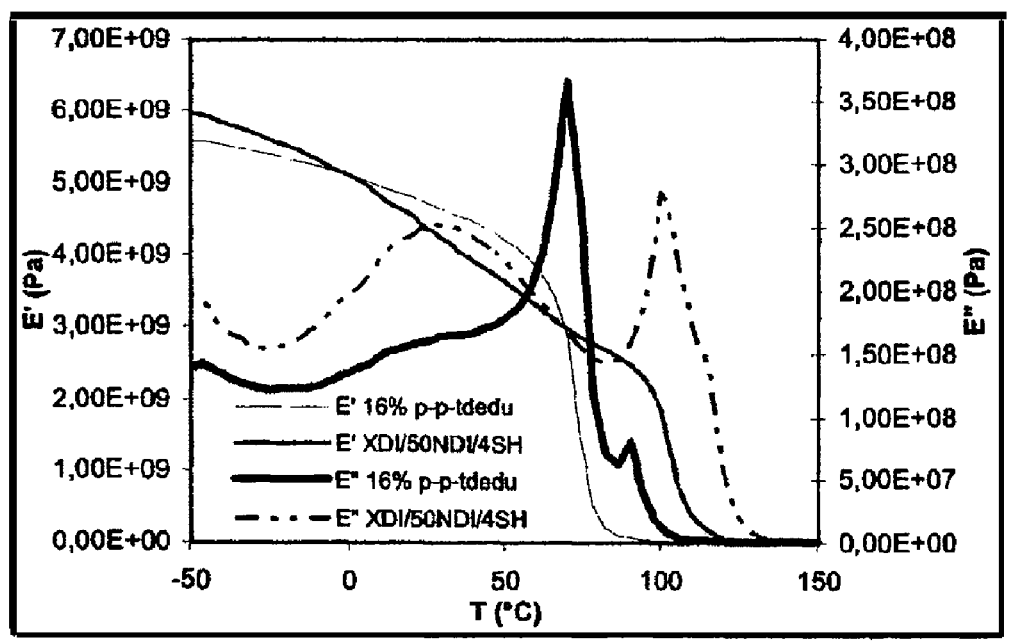
FIG. 1 is a graph illustrating the storage modulus E' and the loss modulus E" by means of a dynamic mechanic analysis (DMA) of a pure polythiourethane XDI/50NDI/4SH matrix and of a polythiourethane antiplasticized matrix according to the invention.

Following examples illustrate the present invention.

Nomenclature

In the following examples, a nomenclature was used to refer to the matrices: all matrices were named basing on a basic matrix produced only from xylylene diisocyanate and the compound 3SH in molar proportions 1eq NCO to 1eq SH (by weight NCO 52%, SH 48%) and hereafter referred to as:

XDI/00NDI/3SH,

The other matrices are referred to by indicating the NDI weight proportion that partly replaces the XDI and the 4SH polythiol that replaces the 3SH polythiol. Thus, the matrix called XDI/50NDI/4SH is one that is analogue to the basic matrix except that 50% by weight XDI were replaced with 50% by weight NDI and 4SH polythiol replaced 3SH polythiol (SH molar eq.).

The nomenclature used for referring to compounds comprising the antiplasticizing additive is as follows:

Polymer +1/N additive (X %), where polymer is the abbreviation for the matrix. Additive is the abbreviation for the additive.

1/N is a fraction of the number of cross-linking points for an additive molecule.

X refers to the percentage by weight of additives.

Example: XDI/00NDI/3SH+1/6dbs (6.17%): the matrix is the basic matrix with XDI and no NDI and with 3SH, to which dibenzyl sulfide (dbs) was added, in an amount of 1 mol additive for 6 cross-linking points, thus corresponding to 6.17% by weight.

Formulations

Formulations of the matrices containing various additives in different concentrations (up to 20% by weight) were prepared from is following raw materials:

The polythiourethane matrices used are:

| Compound | $\delta_{ma}$ (MPa$^{1/2}$) |
|---|---|
| XDI/00NDI/3SH | 26.9 |
| XDI/50NDI/4SH | 26.3 |

General Procedure

Heating was often necessary for dissolving additives in the monomers (up to 120° C. for some additives). Except the solubility parameter, the melt temperature of the additives (or their glass transition temperature Tg, as measured by means of a differential scanning calorimetry (DSC), after hardening) has an influence on the additive solubility. The solubility will be especially high since $\delta_a$ and $T_f$ (additive melt temperature, as measured by DSC) or Tg are low, the isocyanate being a quite better solvent as compared with thiols, and so as to let the additive dissolve itself to prevent the formulation from caking.

Formulations were treated according to following procedure steps consisting in:

1. Mixing the additive together with the isocyanate, upon heating if needed.
2. Adding the thiol, then mixing.
3. Optimizing the solubilization temperature.
4. Hot degassing.
5. Adding catalyst and internal mold release agent, quickly degassing.
6. Filling and starting polymerization cycle.

First assays were conducted with the XDI/00NDI/3SH matrix. However, the pure matrix glass transition temperature is already relatively low for the ophthalmic application. Since the presence of an additive causes the glass transition tem-

| Compound name | Formula | $\delta_{ma}$ (MPa$^{1/2}$) |
|---|---|---|
| Xylylene diisocyanate (XDI) | OCN—⟨benzene ring⟩—NCO | 25.3 |
| Dimethyl norbornyl diisocyanate (NDI) | OCN—⟨norbornyl⟩—NCO | 23.4 |
| Trithiol (3SH) | HS—CH₂—S—CH(—CH₂—S—CH₂—CH₂—SH)—CH₂—SH | 22.7 |
| Tetrathiol (4SH) | HS—CH₂—S—CH(CH₂SH)—S—CH(CH₂SH)—S—CH₂—SH | 23.1 | perature to decrease, the use of the XDI/50NDI/4SH matrix (which $T_g$ is 20° C. higher than that of XDI/00NDI/3SH) was subsequently preferred.

DETAILED FORMULATION EXAMPLE

| Formulation with an additive: XDI/50NDI/4SH + 14% chp-chp-ndu | | |
|---|---|---|
| Name | Weight (g) | Number of moles (mmol) |
| xylylene diisocyanate (xdi) | 4.03 | 21.4 |
| dimethylnorbornyl diisocyanate (ndi) | 4.03 | 19.6 |
| tetrathiol (4sh) | 7.94 | 20.5 |
| release agent (Zelec UN) | 0.02 | 0.1% by weight |
| catalyst (dibutyltin dichloride) | 0.02 | 0.1% by weight |
| chp-chp-ndu additive | 2.56 | 14% by weight |

The additive was added to the isocyanate mixture (XDI+NDI). The mixture was heated at 60° C. and stirred in order to dissolve the additive.

Once the additive was dissolved, the mixture was let cool down to the ambient temperature ($T_{amb}$).

The thiol (4SH) was added.

Mixing at $T_{amb}$ was performed, then a degassing step under vacuum was performed for about 45 min so as to remove bubbles.

The mold release agent and the catalyst were added. Stirring was performed.

The formulation was filtered (filter 1.2 µm) and degassed under vacuum for 10 minutes.

The formulation was heated at 60° C. while stirring for 5 minutes.

Moulds previously pre-heated at 60° C. were filled.

The moulds were placed in an oven, cycle was started: for 2 h increase in temperature from 60° C. to 120° C.; for 2 h hold at 120° C.; for 2 h decrease in temperature from 120° to 50° C. Wait at 50° C.

The moulds were disassembled.

Formulations and results are given in tables I, II and III hereafter:

TABLE I

Formulations in the XDI/50NDI/4SH matrix

| Additives | δ (MPa$^{1/2}$) | theoretical n | Amount (%) | Aspect | Antiplasticization extent | DMA new phase detection | $T_g$ (max tan δ) ° C. | E' 25° C. MPa | E' 100° C. MPa | $G_{Ic}$ (kJ·m$^{-2}$) | $K_{Ic}$ MPa·m$^{1/2}$ |
|---|---|---|---|---|---|---|---|---|---|---|---|
| Pure matrix | — | — | — | — | — | — | 115 | 4380 | 1870 | 0.12 | 0.64 |
| dbs | 21.7 | 1.632 | 12 | transparent, irregular surface | — | — | — | — | — | — | — |
| bptm | 23.0 | 1.689 | 20 | transparent, irregular surface | medium | — | 78 | 3320 | 15 | — | — |
| chp-ch-u | 19.7 | 1.509 | 8 | Weakly diffusing | medium | No | 106 | 4200 | 150 | 0.15 | 0.67 |
| pp-ch-u | 20.9 | 1.558 | 8 | Transparent | medium | No | 98 | 4450 | 72 | — | — |
| | | | 10 | Transparent | high | No | 86 | 4440 | 45 | 0.14 | 0.73 |
| pp-p-u | 22.4 | 1.634 | 8 | Transparent | medium | No | 96 | 4590 | 44 | — | — |
| | | | 10 | Transparent | high | No | 86 | 4600 | 21 | 0.15 | 0.72 |
| chp-chp-xdu | 21.1 | 1.566 | 10 | Very weakly diffusing | medium | No | 104 | 4330 | 170 | — | — |
| | | | 17 | Strongly diffusing | high | Yes | 100 | 3630 | 58 | 0.24 | 0.86 |
| che-che-xdu | 21.4 | 1.573 | 16 | Transparent | high | No | 95 | 4100 | 29 | — | — |
| pe-pe-xdu | 21.5 | 1.556 | 5 | Transparent | medium | No | 96 | 4490 | 45 | — | — |
| | | | 21 | Transparent | medium | No | 70 | 4190 | 16 | 0.29 | 0.96 |
| nm-nm-xdu | 22.3 | 1.615 | 19 | Transparent | medium | No | 96 | 4390 | 27 | — | — |
| pp-pp-xdu | 22.8 | 1.637 | 19 | Transparent | medium | No | 88 | 4300 | 17 | — | — |
| chp-chp-ndu | 20.5 | 1.546 | 10 | Very weakly diffusing | medium | No | 105 | 4150 | 170 | — | — |
| | | | 14 | Weakly diffusing | medium | Yes | 104 | 3850 | 77 | 0.43 | 1.15 |
| | | | 18 | Opaque | medium | Yes, quite clear | 104 | 3110 | 157 | 1.76 | 1.82 |
| che-che-ndu | 20.7 | 1.551 | 17 | Weakly diffusing | high | No | 96 | 4000 | 22 | — | — |
| | | | 23 | Transparent, irregular surface | medium | Yes, quite clear | 96 | 3530 | 25 | — | — |
| pe-pe-ndu | 20.7 | 1.532 | 5 | Transparent | high | No | 98 | 4330 | 47 | — | — |
| | | | 21 | Transparent | medium | No | 78 | 4390 | 15 | 0.18 | 0.73 |
| nm-nm-ndu | 21.4 | 1.589 | 10 | Transparent | medium | No | 102 | 4190 | 92 | — | — |
| | | | 19 | Weakly diffusing | high | No | 100 | 4190 | 36 | 0.15 | 0.71 |
| pp-pp-ndu | 22 | 1.610 | 20 | Transparent | high | No | 88 | 4390 | 17 | — | — |
| ch-ch-tdedu | 0.8 | 1.563 | 10 | transparent, slightly yellow | medium | Yes | 102 | 4110 | 99 | 0.17 | 0.76 |
| p-p-tdedu | 24.2 | 1.689 | 10 | transparent, slightly yellow | high | No | 99 | 4620 | 55 | — | — |
| | | | 16 | Transparent, yellow | high | No | 92 | 4700 | 23 | — | — |
| ch-ch-tdedSu | 22.8 | 1.606 | 6 | strongly diffusing | low | No | 104 | 4430 | 108 | — | — |
| p-p-tdedSu | 25.1 | 1.733 | 6 | strongly diffusing | very low | No | 108 | 4240 | 203 | — | — |
| ch-ch-dtodu | 22.0 | 1.578 | 16 | Weakly diffusing | medium | No | 92 | 4360 | 26 | — | — |
| p-p-dtodu | 24.1 | 1.688 | 16 | Weakly diffusing | high | No | 88 | 4270 | 14 | — | — |

— means no measurement

TABLE II

Formulations in the XDI/00NDI/3SH matrix

| Additives | δ (MPa$^{1/2}$) | theoretical n | Amount (%) | Aspect | Antiplasticization extent | DMA new phase detection | $T_g$ (max tan δ) ° C. | E' 25° C. MPa | E' 100° C. MPa | $G_{Ic}$ (kJ · m$^{-2}$) | $K_{Ic}$ MPa · m$^{1/2}$ |
|---|---|---|---|---|---|---|---|---|---|---|---|
| pure matrix | — | — | — | — | — | No | 94 | 4580 | 20 | 0.19 | 0.80 |
| dbs | 21.7 | 1.632 | 6 | Transparent | Medium | No | 76 | 4610 | 17 | 0.21 | 0.84 |
|  |  |  | 9 | Irregular surface | High | No | 72 | 4450 | 17 | — | — |
|  |  |  | 21 | Opaque | — | No | — | — | — | — | — |
| chp-ch-u | 19.7 | 1.509 | 3 | Transparent | very low | No | 90 | 4550 | 19 | 0.15 | 0.73 |
| pp-ch-u | 20.9 | 1.558 | 6 | Transparent | medium | No | 82 | 4100 | 15 | — | — |
|  |  |  | 11 | Transparent | medium | No | 74 | 4590 | 15 | 0.22 | 0.88 |
|  |  |  | 19 | Irregular surface | medium | No | 64 | 4000 | 12 | — | — |
| pp-p-u | 22.4 | 1.634 | 6 | Transparent | high | No | 82 | 4440 | 16 | — | — |
|  |  |  | 11 | Transparent | high | No | 74 | 4840 | 16 | 0.24 | 0.89 |
| pe-pe-xdu | 21.5 | 1.556 | 5 | Transparent | none | No | 84 | 4630 | 17 | — | — |
|  |  |  | 20 | Irregular surface | high | No | 66 | 4020 | 7 | — | — |
| nm-nm-xdu | 22.3 | 1.615 | 9 | Transparent | low | No | 84 | 4600 | 15 | — | — |
| chp-chp-ndu | 20.5 | 1.546 | 5 | Irregular surface | low | No | 90 | 4370 | 17 | — | — |
| pe-pe-ndu | 20.7 | 1.532 | 5 | Transparent | none | No | 88 | 4350 | 16 | — | — |
|  |  |  | 20 | Transparent | medium | No | 62 | 4490 | 12 | — | — |

TABLE III

Comparison: Prepolymers/Monomers
Matrix: XDI/50NDI/4SH

| Additives | δ (MPa$^{1/2}$) | theoretical n | Amount (%) | Formulation type | Aspect | Antiplasticization extent | DMA new phase detection | $T_g$ (max tan δ) ° C. | E' 25° C. MPa | E' 100° C. MPa |
|---|---|---|---|---|---|---|---|---|---|---|
| chp-ch-u | 19.7 | 1.509 | 8 | Monomers | weakly diffusing | medium | No | 106 | 4200 | 150 |
|  |  |  | 15 | Prepolymers | transparent, irregular surface | low | No | 92 | 3820 | 22 |
| chp-chp-ndu | 20.5 | 1.546 | 14 | Monomers | weakly diffusing | medium | Yes | 104 | 3850 | 77 |
|  |  |  |  | Prepolymers | very weakly diffusing | medium | Yes, quite clear | 106 | 3720 | 100 |
|  |  |  | 18 | Monomers | opaque | medium | Yes, quite clear | 104 | 3110 | 157 |
|  |  |  |  | Prepolymers | strongly diffusing | high | Yes, quite clear | 108 | 3070 | 150 |
| che-che-ndu | 20.7 | 1.551 | 17 | Monomers | weakly diffusing | high | No | 96 | 4000 | 22 |
|  |  |  |  | Prepolymers | weakly diffusing | high | No | 94 | 3970 | 28 |
|  |  |  | 23 | Monomers | transparent, irregular surface | medium | Yes, quite clear | 96 | 3530 | 25 |
|  |  |  |  | Prepolymers | weakly diffusing | high | Yes, quite clear | 102 | 3320 | 50 |

Antiplasticization extent
none: no effect on β transition
low: low decrease in transition amplitude
medium: significant decrease (peak reduced by approx. half)
high: marked decrease, quasi-disappearance of the transition peak Antiplasticization Detection The prepared samples were analyzed by several measuring devices so as to detect the antiplasticization.

Characterization

DMA viscoelasticity measurements make it possible to detect antiplasticzation. β transition attenuation indeed immediately appears on E'=f(T) plotting.

The method that was adopted to select additives seems to show consistency with the obtained results. The extent of such phenomenon nevertheless does vary from one compound to another. With a constant amount, the additives having the most important influence are those which solubility parameters are the highest. This may be due to a stronger affinity with the chains of the matrix, and thus a better blocking of the movement propagation points responsible for β transition.

Antiplasticization therefore does not necessarily show any rise in the E' modulus. Indeed, when the antiplasticizing effect is low, it is insufficient to balance the decrease in the modulus due to the additive being present.

The best systems do increase the E' modulus in a proportion amounting 0,6 GPa maximum, i.e. a 15% increase as compared to the XDI/50NDI/4SH pure matrix modulus which is around 4 GPa, as can be observed in the hereunder table and in FIG. 1.

| Additive | δ (MPa$^{1/2}$) | Amount | Antiplasticizer temperature range | Maximum increase in E' |
|---|---|---|---|---|
| p-p-tdedu | 24.2 | 1/5 (15.9%) | 0° C.-70° C. | 0.6 GPa |
| ch-ch-tdedu + | 23.0 | 1/9 (9.6%) | 10° C.-80° C. | 0.6 GPa |

-continued

| Additive | δ (MPa$^{1/2}$) | Amount | Antiplasticizer temperature range | Maximum increase in E' |
|---|---|---|---|---|
| p-p-tdedu mixture | | | | |
| pp-p-u | 21.9 | 1/4 (14.6%) | 0° C.-55° C. | 0.4 GPa |
| | | 1/8 (7.7%) | 10° C.-70° C. | 0.3 GPa |
| Dbs | 21.7 | 1/6 (8.6%) | 10° C.-60° C. | 0.2 GPa |

The other additives are not so strongly antiplasticizing, but they all attenuate the β transition. This does not necessarily express as an increase in the modulus, although many of them do successfully balance the decrease in the modulus around 30° C.

Should the incorporation rate increase, two opposite phenomena take place.

On the one hand both the modulus in the non antiplasticized zone and the glass transition temperature are reduced because of the greater amount of additive. On the other hand the antiplasticizing effect in the β transition zone is stronger.

The additional decrease in the storage modulus may therefore be balanced by the antiplasticizing effect. However, this is no longer possible when the additive amount becomes excessively high.

Figure 2:
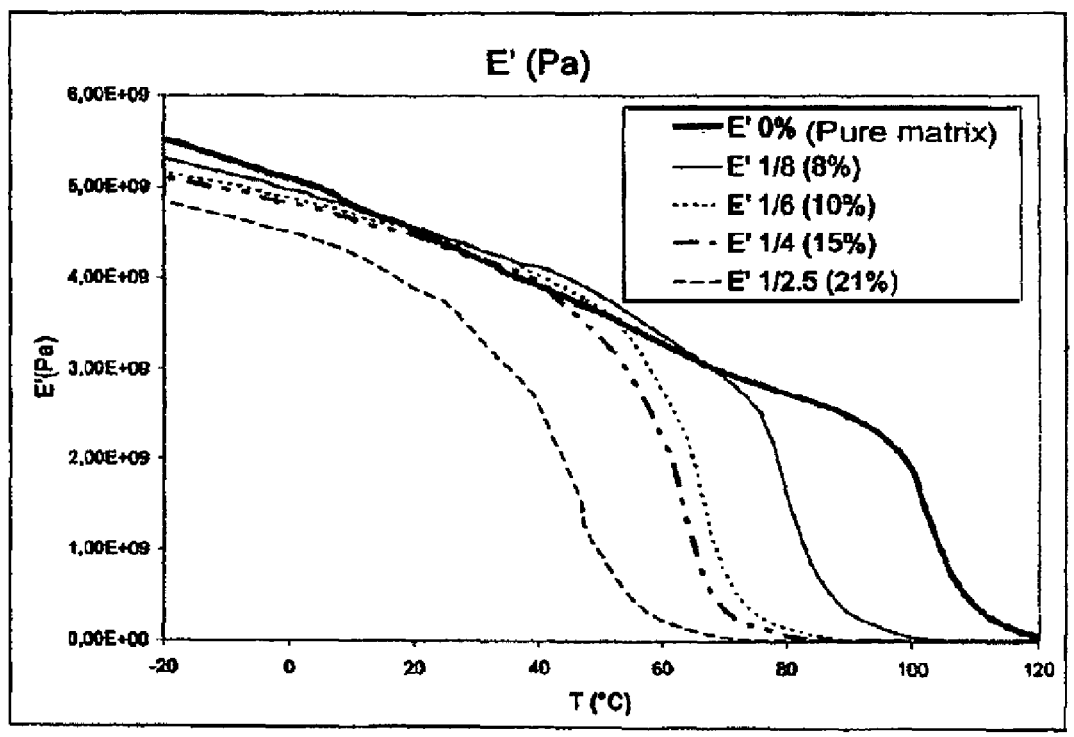
FIGS. 2 and 3 are graphs showing the storage modulus E' evolution vs. temperature for a pure polythiourethane matrix and of the antiplasticized matrix according to the invention with increasing concentrations of pp-ch-u antiplasticizer.
Figure 3:
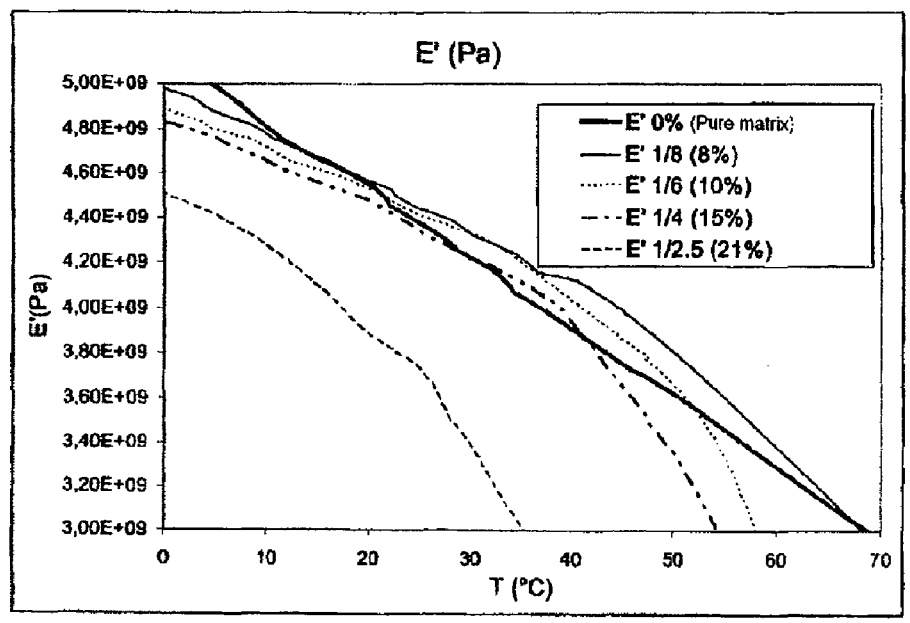

Data analysis concerning the pp-ch-u additive proves it for XDI/50NDI/4SH matrix (FIGS. 2 and 3). 8 and 10% incorporation rates cause the maximum increase in the storage modulus, as compared to the pure matrix in a temperature range of from 20° C. to 60° C. With a 15% incorporation rate, antiplasticization does just balance the modulus decrease around 30C. With 21% of additive, the decrease in the modulus is too strong to be balanced by antiplasticization.

Glass transition

The glass transition temperature of the mixtures is reduced as compared to the pure matrix. This results from the additive, which presence causes the polymer to plasticize.

Achieving Damping: Phase Separation

Antiplasticization is obtained with most of the additives, and the phase separation during polymerization was clearly evidenced for the additives the most suitable for producing such phase separation.

Detection

A second phase may be evidenced in different ways.

When the second phase-characteristic scale is bigger than the crucial size, which depends on the index difference between matrix and additive, the material is diffusing and even to the point of opacity.

Dynamic mechanic analysis (DMA) makes it possible to detect such phase separation by showing a new glass transition peak (μ) on the E" loss modulus plot. Because α and β transitions are so close to each other, it is however difficult to detect an additional peak and using multifrequency data is often required.

Glass transitions (α and μ) are not so frequency-sensitive than do secondary transitions (β). Thus, should the new glass transition (μ) be superimposed to the β transition at a f frequency, measurements at 10×f and f/10 allow to differentiate them. In that case where the system contains 14% of chp-chp-ndu, it was found to be more useful to conduct a high-frequency measurement.

Other measuring methods that are more difficult to carry out could help better characterize the phase separation:

Solid NMR provides molecular mobility values. The presence of two phases results in two relaxation time distributions.

The atomic force microscopy (AFM) may in some cases allow to detect a phase separation. The modulus difference between potential phases is nevertheless very small.

The transmission electron microscopy (TEM) is the particularly recommended method which allows to detect phase separations, whatever macroscopic or nanoscopic in nature, thanks to a ruthenium oxide labelling.

In addition to the solubility parameters of the additives, other parameters may be employed in order to enhance the phase separation formation.

Lattice Formation Cinetics Influence

To avoid any additive demixing (creation of size ranges in the order of the mm or above, that are visible to naked eye, showing a heterogeneous distribution and causing the material to become friable), polymerization conditions may be modified and the lattice formation kinetics may be accelerated.

Polymerization Cinetics

In a first time, only the kinetics influencing parameters were modified and the monomer structure remained unchanged.

Catalyst level—Temperature

Gel time measurements have been conducted for the XDI/00NDI/3SH matrix, at 60° C. and with different catalyst levels. The device used ("gel-timer") does measure the time that is necessary to block the punch oscillatory movement in the formulation.

An infrared spectroscopy follow-up provides a gel point around 60% conversion, in consistency with the theoretical value given by the following Flory and Stockmayers equation:

$$p_c = \frac{1}{\sqrt{f-1}}$$

where $p_c$ is the degree of conversion to the gel point and f the functionality of the multifunctional compound.

Theoretical values are $p_c$=71% for XDI/00NDI/3SH (f=3) and $p_c$=58% for XDI/50NDI/4SH (f=4).

Figure 4:
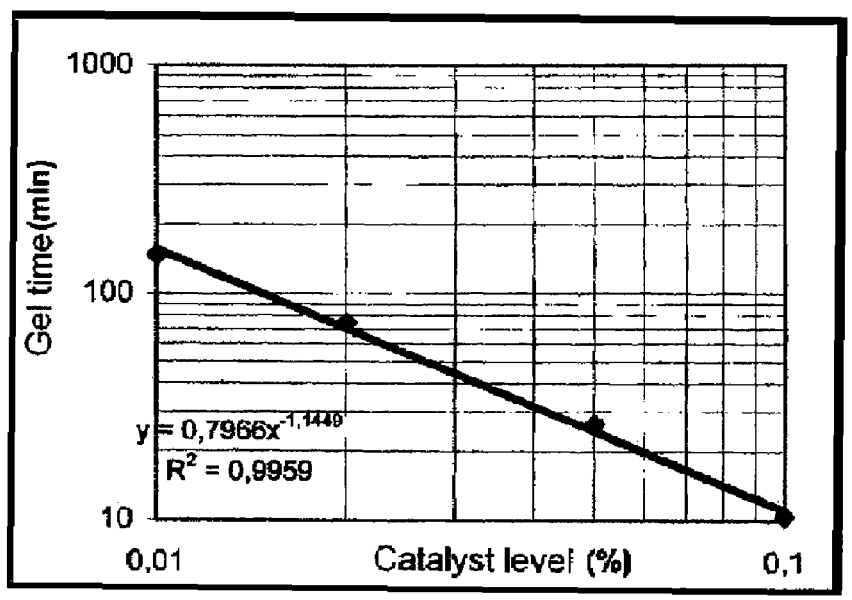
FIG. 4 is a graph showing gel times for the XDI/00NDI/3SH matrix at 60° C., depending on catalyst levels.

The gel time does obey an inverse power law vs. catalyst level (FIG. 4). Thus, using 0.10% of catalyst instead of 0.01% causes the gel time to be divided by 15.

On the other hand, the medium temperature has a significant effect on the gelification: at 120° C. and with no catalyst, the formulation turns to gel within 2 h30, as opposed to more than 24 h at 60° C. (See table hereafter).

| Temperature | Catalyst level (%) | Gel time |
|---|---|---|
| 120° C. | 0 | 2 h 30 |
| 60° C. | 0 | >24 h |
| | 0.01 | 2 h 30 |
| | 0.02 | 1 h 15 |
| | 0.05 | 0 h 30 |
| | 0.10 | 0 h 10 |

Gel time vs. catalyst level, at 60° C. for the XDI/00NDI/2SH matrix

Polymerization Cycle

Figure 5:
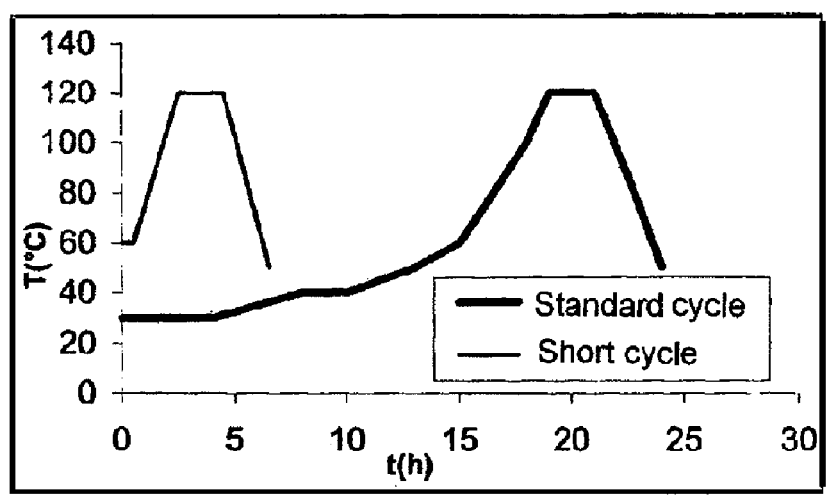
FIG. 5 is a graph showing standard and short cycles (starting at 60° C.) used for the polyaddition reaction.

It is possible to take advantage of the influence of the temperature on the polymerization reaction by varying the temperature—time cycle. Instead of a long polymerization cycle (approximatively 20 h to reach 120° C.), the gel point will preferably be reached more rapidly thanks to a short cycle, with a 2 hour-long increasing ramp up to 120° C., starting from the miscibility temperature of the additive in the monomers (start at 60° C. in FIG. 5 as an example).

Use of Prepolymers

Prepolymers were synthesized so as to accelerate the gelification.

The amounts were as follows:

Isocyanate end group prepolymer (NCO): 1 thiol function (SH) for 8 isocyanate functions (NCO).

Thiol end group prepolymer (SH): 1 isocyanate function (NCO) for 8 thiol functions (SH).

The development of NCO prepolymers requires special attention to ensure the reproducibility of the results, in particular to prevent any possible condensation reaction of the isocyanates in isocyanurates which would add cross-linking points to the system as a consequence.

A gel permeation chromatography (GPC) assay conducted on two batches reveals in this regard a deviation concerning the NCO prepolymer weight distributions. The weights that are indicated in the table do not take the remaining free isocyanates into account, which have an elution volume too similar to the residual volume.

The SH prepolymer does not require so much attention, this being confirmed by a good reproducibility between both GPC-analyzed batches.

| Sample | $M_n$ | $M_w$ | $I = \dfrac{M_w}{M_n}$ |
|---|---|---|---|
| NCO prepolymer, batch 1 | 1633 | 9360 | 5.7 |
| NCO prepolymer, batch 2 | 1435 | 3781 | 2.6 |
| SH prepolymer, batch 1 | 250 | 1099 | 4.4 |
| SH prepolymer, batch 2 | 262 | 1046 | 4.0 |

GPC results, weights in polystyrene equivalent, for 2 XDI/50NDI/4SH prepolymer batches
($M_n$: number average molecular weight; $M_w$: weight average molecular weight; I: polydispersity).

Gel time measurements reveal that in similar reaction conditions (catalyst, temperature), using prepolymers causes the gel time to be reduced by a factor of 2, making it very interesting for accelerating the matrix production.

In addition to using prepolymers, another catalytic system may be used as an initiator. This relies on a potassium isothiocyanate (KSCN) complexed with a crown ether. In such a case the gel time for a mixture made at the ambient temperature is less than 5 min and has a high exothermicity (a bove 120° C.).

Preparation of XDI/50NDI/4SH Prepolymers

Isocyanate Prepolymer

Each of the (XDI, NDI) isocyanate monomers is divided in two parts, XDI-1 and XDI-2, and NDI-1 and NDI-2, respectively. Each of the parts is then blended according to the hereunder procedure.

| Name | Weight (g) | mole number (mol) |
|---|---|---|
| XDI-1 | 62.60 | 0.333 |
| NDI-1 | 62.60 | 0.304 |
| 4SH | 27.43 | 0.071 |
| XDI-2 | 48.69 | 0.259 |
| NDI-2 | 48.69 | 0.236 |

Admixing thiol (4SH) with isocyanate mixture - 1 (XDI-1 + NDI-1).
Heating at 118° C. and stirring for 2 hours.
Adding the isocyanate mixtures - 2 (XDI-2 + NDI-2).
Cooling to the ambient temperature.
Keeping under inert atmosphere ($N_2$, Ar).

Thiol Prepolymer

| Name | Weight (g) | Number of moles (mol) |
|---|---|---|
| 4SH-1 | 166.40 | 0.429 |
| XDI | 14.07 | 0.075 |
| NDI | 14.07 | 0.068 |
| 4SH-2 | 55.47 | 0.143 |

The thiol monomer is divided in two parts, each having a different weight and being referred to as 4SH-1 and 4SH-2.
Mixing 4SH-1 with (XDI + NDI) isocyanates.
Heating at 93° C. and stirring for 4 hours.
Checking NCO peak disappearance using an IR spectroscopy.
Adding 4SH-2 and cooling to the ambient temperature.

Results

Thanks to the polymerization reaction acceleration, the gel point is achieved more rapidly. It makes it thus possible to prevent a demixing before the gel point, and thermoset antiplasticized plastic materials exhibiting a phase separation could be obtained.

For example, in the XDI/50NDI/4SH matrix:
- 8% chp-ch-u: demixes with the long thermal cycle; hardly diffusing as evaluated by visual examination with the short cycle, thus demonstrating a phase separation.
- 10% ch-ch-tdedu: demixes with 0.02% catalyst, transparent with 0.07%.
- 18% chp-chp-ndu: totally, evenly opaque when the formulation includes the monomers, strongly diffusing but non opaque with the prepolymers.

Dynamic Mechanic Analysis (DMA)

A new peak could not be evidenced for all diffusing systems. The samples however have not all been measured for various frequencies to decorrelate potential superimposed peaks.

| (XDI/50NDI/4SH matrix) | | |
|---|---|---|
| Additive | Level from which the material becomes diffusing in the slowest kinetic conditions | New transition DMA signature |
| ch-ch-tdedu | 10% | YES |
| chp-chp-ndu | 14% | YES |
| chp-chp-xdu | 10% | YES |
| che-che-ndu | 23% | YES |
| che-che-xdu | 16% | NO |
| nm-nm-ndu | 19% | NO |
| Ch-ch-tdedu + p-p-tdedu mixture | 10% | NO |
| p-p-tdedSu | 6% | NO |
| ch-ch-tdedSu | 6% | NO |

-continued

| | (XDI/50NDI/4SH matrix) | |
|---|---|---|
| Additive | Level from which the material becomes diffusing in the slowest kinetic conditions | New transition DMA signature |
| p-p-dtodu | 16% | NO |
| ch-ch-dtodu | 16% | NO |
| chp-ch-u | 8% | NO |

When there is a phase separation, the antiplasticizing effect is not so strong and does not enable any increase in the E' modulus as compared to the pure matrix. This is very probably due to the lower interaction between the additive and the matrix, needed for the phase separation.

As far as the chp-chp-ndu additive is concerned, the DMA-identified phase separation resulting in diffusing lenses was further characterized by means of a transmission electron microscopy, with 75 nm inclusions.

The chp-chp-ndu additive:

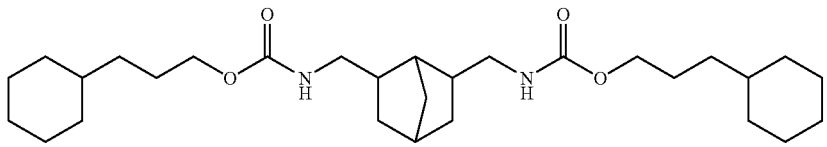

was found to be especially interesting.

It produces a DMA visible phase separation creating hardly diffusing lenses. Using the prepolymer and catalytic system thereof may be advantageous to obtain transparent materials.

The ch-ch-tdedu additive is interesting as well, as it is transparent with a nanophase separation as evidenced by a transmission electron microscopy (phase typical size is less than 20 nm). Toughness measurements have been carried out again with many different incorporation rates and have been gathered in the table of the section called "toughness measurements".

Toughness

The toughness of some formulations was evaluated by a three-point bend fracture in notched specimens.

Toughness Measurements

Linear Elasticity Fracture Mechanics Criteria

The linear elasticity fracture mechanics applies to materials obeying the Hooke's law (proportional relationship between applied stress and strain) when applying a stress onto the notched specimen (in our assay: mode I, tension crack opening). In this context, measuring two interdependent measurable variables enables to characterize the fracture mechanics:

$G_{Ic}$: fracture energy (energy needed to initiate crack propagation)

$K_{Ic}$: fracture toughness (crack initiation strength of the material)

with $$G_{Ic} = \frac{K_{Ic}^2}{E}$$

in case of plane stress, and $$G_{Ic} = \frac{K_{Ic}^2 \cdot (1 - v^2)}{E}$$

in case of plane strain

Experiment Procedure

Fracture tests were conducted on 3 point-bend specimens with an Instron 4301 apparatus (measures at 20° C.—in an air-conditioned room).

Figure 6:
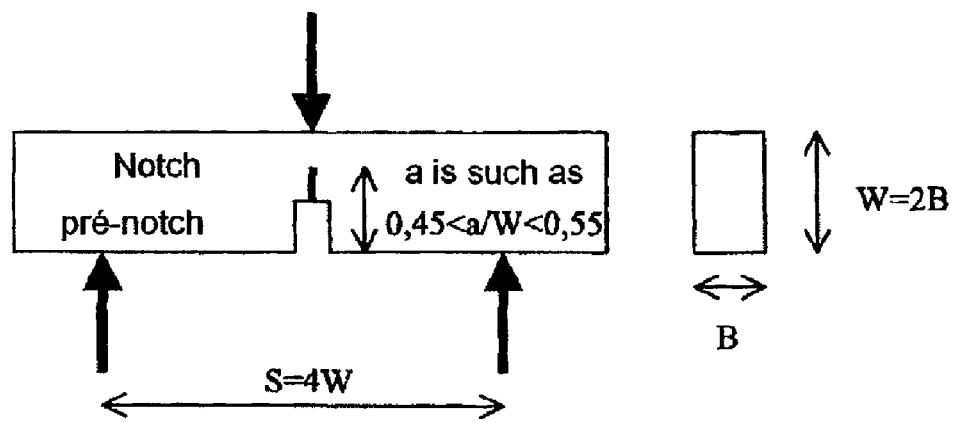
FIG. 6 is a graph showing the geometry of the 3 point-bend test specimen used in the fracture tests.

Specimens to be used for fracture tests as illustrated in FIG. 6, were cut from 6 mm thick small disks to have a size in accordance with what Williams recommended in his experiment procedure[1]. In a first step, the specimens were pre-cut with a 0.5 mm thick cutter, then annealed at 120° C. for 2 hours. Finally, a V-notch was made using a razor blade as a pre-notch ground, by means of a guillotine system.

Criteria concerning specimen geometry and notching must be strictly met so as to test the specimen in maximal brittleness conditions by applying formulas for $K_{Ic}$, and $G_{Ic}$.

In the present case B=6 mm, W=12 mm.

Calculation of fracture measurable variables $K^{Ic}$ is experimentally determined basing on following equation:

$$K_{Ic} = f(\alpha) \times \frac{P_{max}}{BW^{1/2}}$$

where B and W correspond respectively to the thickness and the height of the specimen.

a corresponds to the depth of the notch (notch+pre-notch).

$P_{max}$ corresponds to the maximum load encountered during the fracture test.

$$\alpha = \frac{a}{W}.$$

f is a geometric factor for a specimen having such geometry expressed by following equation:

$$f(\alpha) = 6\alpha^{1/2} \frac{1.99 - \alpha(1-\alpha)(2.15 - 3.93\alpha + 2.7\alpha^2)}{(1-2\alpha)(1-\alpha)^{3/2}}$$

$G_{Ic}$ is experimentally determined as follows:

$$G_{Ic} = \frac{U_i}{BW\Phi(\alpha)}$$

where $U_i$ is the area under the force vs. displacement curve to $P_{max}$.

$\Phi$ corresponds to a geometric factor:

$$\Phi(\alpha) = \frac{\Theta + 18.64}{\frac{d\Theta}{d\alpha}}$$

with $$\begin{cases} \Theta(\alpha) = \frac{16\alpha^2}{(1-\alpha)^2}\left(8.9 - 33.717\alpha + 79.616\alpha^2 - 112.952\alpha^3 + 84.815\alpha^4 - 25.672\alpha^5\right) \\ \frac{d\Theta}{d\alpha}(\alpha) = \frac{16\alpha^2}{(1-\alpha)^2}(-33.717 + 159.232\alpha - 338.856\alpha^2 + 339.26\alpha^3 - 128.36\alpha^4) + \\ \qquad \frac{16\alpha^2}{(1-\alpha)^2}(8.9 - 33.717\alpha + 79.616\alpha^2 - 112.952\alpha^3 + 84.815\alpha^4 - 25.672\alpha^5) \end{cases}$$

Results of the Measurements

These results include the results as mentioned in table I for XDI/50NDI/4SH, except those with an asterisk.

The results demonstrate the efficiency of the additives, especially of the chp-chp-ndu additive, for reinforcing the material. They show especially an increase in the energy release rate $G_{IC}$ as compared to the pure matrix.

As regards the ch-ch-tdedu additive, at 10%, the µ transition expressed as a shoulder in alpha main transition. Any µ transition could not be observed with high incorporation rates because the alpha and beta transitions are excessively close to each other.

The most promising chp-chp-ndu-containing materials despite diffusion were subsequently tested as to their impact resistance.

Impact Resistance

The fracture energy for lenses was tested according to the FDA ophthalmic glass impact resistance standard. This assay consists in dropping a ball weighing 16 g from a 127 cm height in the centre of a convex face of a lens, corresponding to an energy of 200 mJ. To measure the fracture energy for ophthalmic lenses, balls are dropped with an increasing energy in the centre of a lens until a starred crack occurs or until it comes to the point of bursting. The lens fracture energy is then calculated.

Sample shape: concave lens, dioptries-2, centre thickness: 1.55 mm.

Two materials were tested:
XDI/50NDI/4SH pure matrix
14% chp-chp-ndu-loaded matrix The correlation is good between the results concerning toughness and impact resistance, despite strongly scattered data for the material containing the additive. The impact resistance is therefore improved by the additive.

| Sample | $T_g$ (max tan δ) °C. | DMA revealed µ transition | Diffusing material | $K_{Ic}$ (MPa·m$^{1/2}$) | $G_{Ic}$ (kJ·m$^{-2}$) |
|---|---|---|---|---|---|
| XDI/50NDI/4SH pure matrix | 100 | — | — | 0.64 | 0.12 |
| 1/17 chp-ch-u (4%)* | 82 | no | no | 0.67 | 0.15 |
| 1/8 chp-ch-u (8%) | 106 | no | Yes | 0.67 | 0.15 |
| 1/5 nm-nm-ndu (20%) | 100 | no | Yes | 0.71 | 0.15 |
| 1/6 pp-ch-u (10%) | 86 | no | No | 0.73 | 0.14 |
| 1/2.5 pp-ch-u (21%)* | — | no | No | 0.72 | 0.18 |
| 1/4 pe-pe-ndu (21%) | 78 | no | No | 0.73 | 0.18 |
| 1/9 ch-ch-tdedu (10%) | 102 | yes | No | 0.76 | 0.17 |
| 1/4 pe-pe-xdu (21%) | 70 | no | No | 0.96 | 0.29 |
| 1/6 chp-chp-xdu (17%) | 100 | yes | Yes | 0.86 | 0.24 |
| 1/8 chp-chp-ndu (14%) | 104 | yes | Yes | 1.15 | 0.43 |
| 1/6 chp-chp-ndu (18%) | 104 | yes | Opaque | 1.82 | 1.76 |
| 1/9 ch-ch-tdedu (10%) | 102 | yes | no | 0.85 | 0.23 |
| 1/6 ch-ch-tdedu (14%)* | 97 | no | no | 0.90 | 0.20 |
| 1/4 ch-ch-tdedu (20%)* | 92 | no | no | 0.90 | 0.21 |

| Sample | Fracture energy | $K_{Ic}$ (MPa·m$^{1/2}$) | $G_{Ic}$ (kJ·m$^{-2}$) |
|---|---|---|---|
| XDI/50NDI/4SH matrix | 2400 mJ | 0.64 | 0.12 |
| XDI/50NDI/4SH + 14% chp-chp-ndu | 4300 mJ (very scattered) | 1.15 | 0.43 |

The invention claimed is:

1. A thermoset plastic material comprising a three-dimensional matrix containing sulphur atoms and at least one antiplasticizing additive that does not react with said matrix, wherein the three-dimensional matrix is a polythiourethane matrix or a polyepisulfide matrix, and wherein the antiplasticizing additive is a dialkyl sulfide, diaryl sulfide, dialkylaryl sulfide, alkylaryl sulfide, arylalkyl aryl sulfide, aryl alkylsilane sulfide, S-arylthioalkylate, bis-arylthioalkyl, a compound containing a thiourea group, a compound containing one urethane group, or a compound containing a carbonyl group of formula:

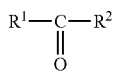

wherein $R^1$ and $R^2$ are independently an alkyl radical, a cycloalkyl radical, an aryl radical, an arylalkyl radical, or a radical of formula:

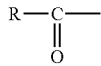

wherein R is an alkyl radical or a trialkyl radical.

2. The material of claim 1, wherein the polythiourethane matrix is produced by means of a polyaddition reaction of a NCO end group-containing polythiourethane prepolymer with a SH end group-containing polythiourethane prepolymer.

3. The material of claim 2, wherein the NCO end group-containing polythiourethane prepolymer has a number average molecular weight ranging from 1000 to 2000.

4. The material of claim 2, wherein the NCO end group-containing polythiourethane prepolymer has a NCO/SH ratio from 4:1 to 30:1.

5. The material of claim 2, wherein the SH end group-containing polythiourethane prepolymer has a number average molecular weight ranging from 200 to 300.

6. The material of claim 2, wherein the SH end group-containing polythiourethane prepolymer has a SH/NCO ratio ranging from 4:1 to 30:1.

7. The material of claim 2, wherein the NCO end group-containing polythiourethane prepolymer and/or the SH end group-containing polythiourethane prepolymer results from the polyaddition of xylene diisocyanate and/or dimethyl norbornyl diisocyanate with polythiol of formula:

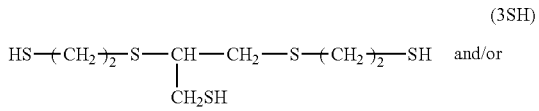 and/or (3SH)

-continued

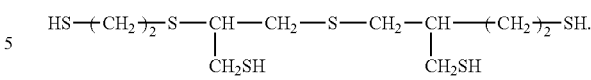

(4SH)

8. The material of claim 1, wherein antiplasticizing additive has an antiplasticization temperature in the range of temperatures from 0 to 85° C.

9. The material of claim 1, wherein the antiplasticizing additive has a solubility parameter $\delta_a$, wherein:

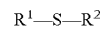

$\delta_{mo} - \delta_a < 5$ MPa$^{1/2}$ and $\delta_{mo}$ is a solubility parameter of polyisocyanate and polythiol monomers used to produce the matrix.

10. The material of claim 1, wherein the antiplasticizing additive has a solubility parameter $\delta_a$, wherein:

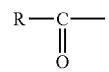

$\delta_{ma} - \delta_a > 4$ MPa$^{1/2}$ and $\delta_{ma}$ corresponds is a solubility parameter of the matrix.

11. The material of claim 1, wherein the antiplasticizing additive has a solubility parameter $\delta_a$, wherein:

$19 \leq \delta a \leq 23$.

12. A thermoset plastic material comprising a three-dimensional matrix containing sulphur atoms and at least one antiplasticizing additive that does not react with said matrix, wherein the antiplasticizing additive comprises a sulfide of formula:

$R^1$—S—$R^2$ wherein $R^1$ and $R^2$ are independently an alkyl radical, a cycloalkyl radical, an aryl radical; an arylalkyl radical, a radical:

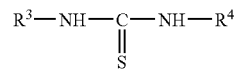

wherein R is an alkyl radical, or a trialkyl silane radical.

13. A thermoset plastic material comprising a three-dimensional matrix containing sulphur atoms and at least one antiplasticizing additive that does not react with said matrix, wherein the antiplasticizing additive is a thiourea compound of formula:

$$R^3—NH—\underset{\underset{S}{\|}}{C}—NH—R^4$$

wherein $R^3$ and $R^4$ are independently an alkyl radical, a cycloalkyl radical, an alkyl radical bearing a nitrogen and/or an oxygen heterocycle.

14. The material of claim 13, wherein at least one of $R^3$ and $R^4$ is a $C_1$-$C_{12}$ alkyl radical, a 6-membered radical, or a 4-morpholinoalkyl radical.

15. A thermoset plastic material comprising a three-dimensional matrix containing sulphur atoms and at least one antiplasticizing additive that does not react with said matrix, wherein the antiplasticizing additive is a urethane compound of formula:

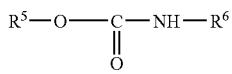

wherein R⁵ and R⁶ are independently a cycloalkyl group, a cycloalkyl alkyl group, an aryl group, or an arylalkyl group.

16. The material of claim 15, wherein at least one of R⁵ and R⁶ is a 6-membered radical, a cyclohexylalkyl group, a phenyl group, or a phenylpropyl group.

17. A thermoset plastic material comprising a three-dimensional matrix containing sulphur atoms and at least one antiplasticizing additive that does not react with said matrix, wherein the antiplasticizing additive is dioctyl sulfide, benzyl and phenyl sulfide, dibenzyl sulfide, 4-(p-tolylthio)benzophenone, bis(phenylthio)methane, S-phenylthiopropionate, phenylthiomethyltrimethyl silane, 1-cyclohexyl-3-(2-morpholinoethyl)-2-thiourea, phenylpropyl-phenylmethane, cyclohexyl-cyclohexyl (thiodiethane di-S-thiourethane), or phenyl-phenyl (thiodiethane di-S-thiourethane).

18. A thermoset plastic material comprising a three-dimensional matrix containing sulphur atoms and at least one antiplasticizing additive that does not react with said matrix, wherein the antiplasticizing additive has one of the formulae:

23. The material of claim 21, wherein the polythiol is a tri- or tetrathiol.

24. The material of claim 21, wherein the polyisocyanate an aromatic polyisocyanate, aliphatic polyisocyanate, or cycloaliphatic polyisocyanate.

25. The material of claim 24, wherein the polyisocyanate is phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzyl triisocyanate, xylylene diisocyanate (XDI), benzyl triisocyanate, 4,4'-diphenylmethanediisocyanate and isophorone diisocyanate, hexamethylene diisocyanate, bis(isocyanate)methyl cyclohexane, dicyclohexyl methane diisocyanate, dimethyl norbornyl diisocyanate (NDI), or norbornyl methyl diisocyanate.

26. The material of claim 21, wherein the polythiol is:

wherein R' is an organic group the valence of which corresponds to n'; where n' is an integer ranging from 2 to 6.

27. The material of claim 26, wherein the polythiol has following formula:

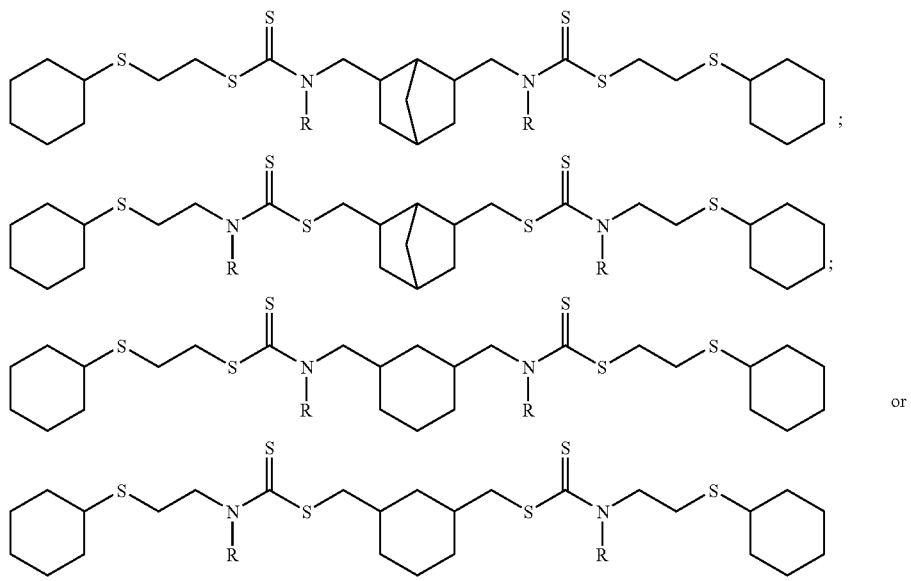

wherein R is H, an alkyl group, or an aryl group.

19. The material of claim 1, wherein the antiplasticizing additive is present in amount ranging from 5 to 25% by weight of the total weight of the matrix.

20. The material of claim 19, wherein the antiplasticizing additive is present in amount ranging from 5 to 15% by weight of the total weight of the matrix.

21. The material of claim 1, wherein the matrix is producible by polyaddition of at least one polyisocyanate and at least one polythiol.

22. The material of claim 21, wherein the polyisocyanate is a diisocyanate.

wherein n is an integer ranging from 1 to 4, p, q and r are integers ranging from 1 to 4, and m is the integer 1 or 2.

28. The material of claim 27, wherein the polythiol is penthaerythritol tetrakis mercaptopropionate, 1-(1'-mercaptoethylthio)-2,3-dimercapto propane, 1-(2'mercaptopropylthio)-2,3-dimercapto propane, 1-(3'-mercaptopropylthio)-2,3-dimercapto propane, 1-(4'-mercaptobutylthio)-2,3-dimercapto propane, 1-(5'-mercaptopenthylthio)-2,3- dimercapto propane, 1-(6'-mercpatohexylthio)-2,3-dimercapto propane, 1,2-bis(4'-mercaptobutylthio)-3, mercapto propane, 1,2-bis(6'-mercaptohexyl)-3-mercapto propane, 1,2,3-tris(mercaptomethylthio)propane, 1,2,3-tris (3'-mercaptopropylthio) propane, 1,2,3-tris(2'-mercaptoethylthio)propane, 1,2,3-tris-(4'-mercaptobutylthio)propane, 1,2,3-tris(6'-mercaptohexylthio)propane, 1,6-hexanethiol-1, 2,3-propanetritiol, or 1,2-bis(2'-mercaptoethylthio)-3-mercapto propane.

29. The material of claim 28, wherein the polythiol has following formula:

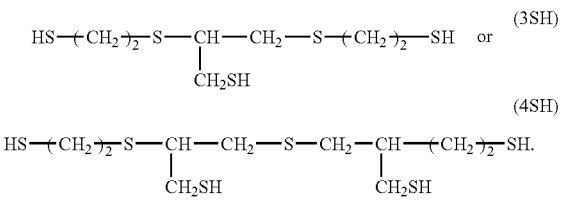

30. The material of claim 1, further defined as having a phase separation.

31. The material of claim 30, further defined as having a nanophase separation.

32. The material of claim 1, further defined as having an energy release ratio $G_{1C}$ of at least 0.15 kJ.m$^{-2}$.

33. An ophthalmic lens comprising an optically transparent, thermoset plastic material, comprising a three-dimensional polymer matrix, the loss modulus (E'') of which presents a secondary glass transition (β), and at least one antiplasticizing additive.

34. The ophthalmic lens of claim 33, wherein the thermoset material has a nanophase separation.

35. The ophthalmic lens of claim 33, wherein the matrix is a polyurethane matrix or a matrix producible by polymerizing a composition comprising at least one polyepisulfide.

36. The ophthalmic lens of claim 33, wherein the antiplasticizing additive has a solubility parameter $δ_a$ and:

$$δ_{mo}-δ_a<5MPa^{1/2}$$

wherein $δ_{mo}$ corresponds to the solubility parameter of polyisocyanate and polythiol monomers used to produce the polythiourethane matrix.

37. The ophthalmic lens of claim 33, wherein the antiplasticizing additive has a solubility parameter $δ_a$ and:

$$δ_{ma}-δ_a>4MPa^{1/2}$$

wherein $δ_{ma}$ corresponds to the solubility parameter of the matrix.

38. The ophthalmic lens of claim 33, wherein the thermoset material comprises a three-dimensional matrix containing sulphur atoms and at least one antiplasticizing additive that does not react with said matrix.

39. A method of making an ophthalmic lens comprising:
   obtaining a thermoset plastic material comprising a three-dimensional matrix containing sulphur atoms and at least one antiplasticizing additive that does not react with said matrix; and
   using the material to form a lens.

* * * * *

UNITED STATES PATENT AND TRADEMARK OFFICE
CERTIFICATE OF CORRECTION

PATENT NO. : 7,622,526 B2 Page 1 of 1
APPLICATION NO. : 10/595265
DATED : November 24, 2009
INVENTOR(S) : Nicolas Droger et al.

It is certified that error appears in the above-identified patent and that said Letters Patent is hereby corrected as shown below:

In title page, item (73) Assignee, after "Essilor International", insert --(Compagnie Generale d'Optique)--.

Signed and Sealed this

Ninth Day of February, 2010

David J. Kappos
*Director of the United States Patent and Trademark Office*